H. A. VERGES.
FRICTION CLUTCH.
APPLICATION FILED JAN. 18, 1913.
1,199,512.
Patented Sept. 26, 1916.
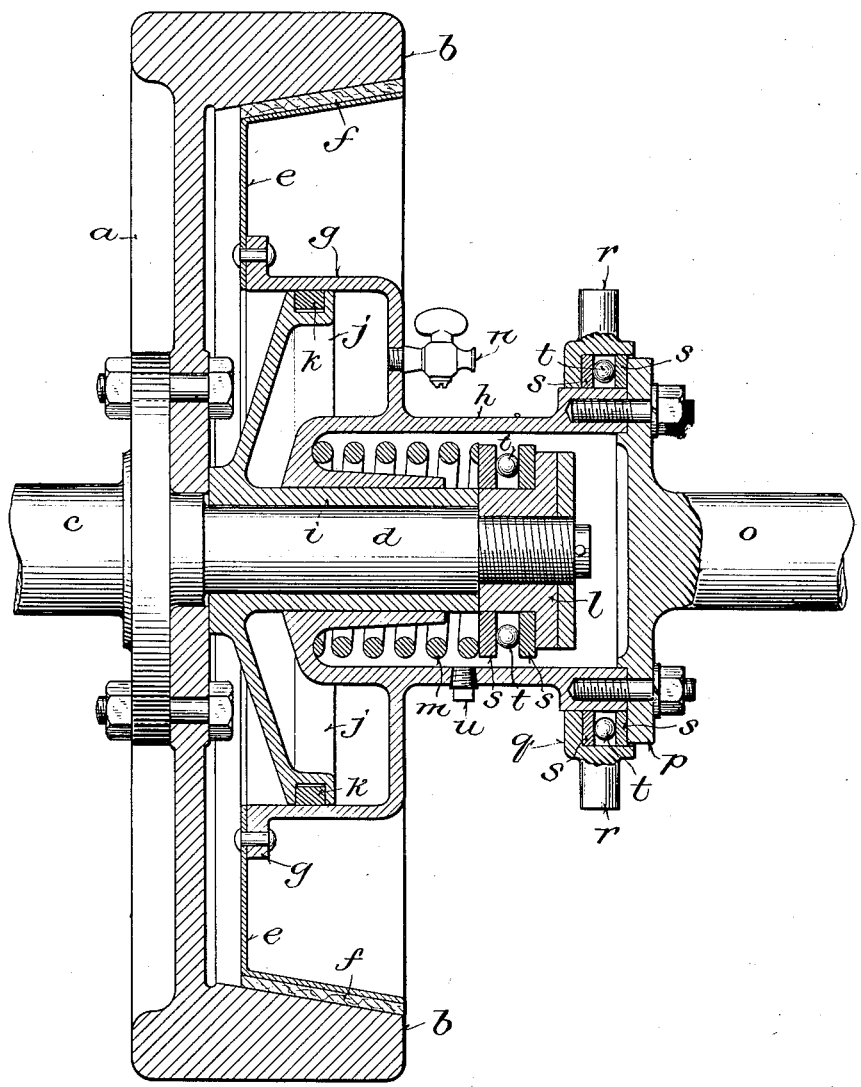

UNITED STATES PATENT OFFICE.

HENRY A. VERGES, OF MILWAUKEE, WISCONSIN, ASSIGNOR TO VERGES MANUFACTURING CO., OF MILWAUKEE, WISCONSIN, A CORPORATION OF WISCONSIN.

FRICTION-CLUTCH.

1,199,512.      Specification of Letters Patent.      Patented Sept. 26, 1916.

Application filed January 18, 1913. Serial No. 742,807.

*To all whom it may concern:*

Be it known that I, HENRY A. VERGES, a citizen of the United States, residing at Milwaukee, in the county of Milwaukee and State of Wisconsin, have invented certain new and useful Improvements in Friction-Clutches, of which the following is a specification, reference being had to the accompanying drawing, forming a part thereof.

This invention relates to air-checked friction clutches of the type shown by United States Letters Patent No. 1,027,377, dated May 21, 1912.

The main objects of the present invention are to permit immediate reëngagement of the clutch members after momentary separation thereof, as well as to prevent shock to and excessive strain upon the clutch and connected mechanism incident to instantaneous engagement of the clutch, and generally to simplify and improve the construction and operation of clutches of this class.

It consists in the construction, arrangement and combination of parts as hereinafter particularly described and pointed out in the appended claims.

For the purpose of illustration the invention is shown as embodied in a clutch specially designed for use in motor vehicles, but it may be embodied in any other forms and varied in the details of construction and arrangement of its parts for other uses within the scope of the invention.

Referring to the accompanying drawing, which is an axial section of such a clutch, $a$ designates the driving member, which in the present case represents the flywheel of an engine. It is formed with an internal coned rim $b$, and is fixed on a shaft $c$, which is extended through an opening in the web of the wheel and forms a spindle $d$ concentric with the rim $b$.

The driven member of the clutch comprises a conical cupped or flanged sheet metal section $e$, the rim or flange of which is provided on the outer side with a facing $f$ of leather or other suitable wearing material. The web of the cupped or flanged section $e$ is fastened by rivets or other means to the outwardly flanged inner end of an air cylinder $g$, which is concentric with said rim or flange and is formed with a central recessed hub $h$, partly within said cylinder. The hub $h$ is mounted and movable endwise on the hub $i$ of a piston $j$ fitting within the cylinder $g$ and provided with suitable packing $k$. The hub $i$ is rotatably mounted and confined on the spindle $d$ between the hub or web of the flywheel or driving clutch member $a$ and a flanged nut $l$ threaded on the reduced end of said spindle $d$. A spiral spring $m$ inclosed in the recessed hub $h$ and pressing at its inner end against said hub and at its outer end against a ball bearing interposed between it and the flange of the nut $l$, tends to shift the driven member $e$ into engagement with the driving member $a$ of the clutch and to hold said members in engagement with each other. A cock $n$, threaded in an opening in the outer closed end of the cylinder $g$, forms a restricted and adjustable air passage both for the admission and discharge of air from the cylinder when the clutch members are moved apart and together. A flanged transmission shaft or member $o$ is bolted or fastened to the outwardly projecting open end of the hub $h$, forming a closure therefor. The flange of the shaft or member $o$ projects radially beyond the hub $h$ and forms a shoulder or bearing $p$ for a shifting collar $q$ loosely mounted on the hub $h$ and formed or provided with pintles $r$ on the opposite sides thereof for the connection therewith of a forked lever or other device for shifting the driven member $e$ out of engagement with the driving member $a$ of the clutch against the tension of the spring $m$. The collar $q$ is preferably internally recessed and provided with a ball bearing between it and the shoulder or bearing $p$.

The ball bearings between the flange of the collar $l$ and the spring $m$ and between the collar $q$ and the shoulder or bearing $p$ may consist as shown, of hardened steel rings or races $s$, and interposed balls $t$. The recessed hub $h$ inclosing the spring $m$ and the nut and ball bearing at the outer end of the spindle $d$, forms a chamber for lubricant, which may be supplied thereto through an opening formed in one side of the hub and provided with a screw cap or plug $u$.

In the operation of the clutch, when the collar $q$ is released, the spring $m$ forces the driven member $e$ of the clutch gradually toward and into engagement with the driving member $a$, the movement of the member $e$ toward the member $a$ being checked by the air which is confined in the cylinder $g$ and which escapes therefrom more or less rapidly through the cock $n$, according to the adjustment of the cock. The driven member $e$ being brought gradually into frictional engagement with the rotating driving member $a$, is thus started slowly and smoothly, thereby avoiding shock to and excessive strain upon the clutch and the mechanism connected therewith, the driven member quickly but gradually, acquiring the speed of the driving member.

When the driven member $e$ is withdrawn from engagement with the driving member $a$ by means of the collar $q$ and the lever or other shifting device connected therewith, against the tension of the spring $m$, the space between the closed outer end of the cylinder $g$ and the piston $j$ is enlarged, thereby producing a partial vacuum within the cylinder and drawing air into said space through the cock $n$ more or less rapidly, according to the adjustment of the cock.

Friction due to end thrust between the flanged collar $l$ and spring $m$ when the clutch members are separated and the spindle $d$ with the nut $l$ are rotated independently of the hub $h$, and friction between the shoulder or bearing $p$ and the shifting collar $q$ when pressure is exerted on the collar to separate the clutch members, are avoided or materially reduced by the ball bearings $s$ $t$, which enable the connected parts to rotate independently of one another freely and without wear.

In the operation of a clutch it is frequently desirable after a momentary separation of the driving and driven members, to promptly reëngage them, as for example, when a shift is made from a higher to a lower speed transmission gear in running an automobile up a steep hill. In such cases, after a momentary separation of the clutch members, the driven member $e$ being immediately released, is promptly reëngaged with the driving member by the joint action of the spring $m$ and the partial vacuum in the cylinder $g$. The partial vacuum produced and maintained for a short time in the cylinder $g$ by the restricted admission of air through the cock $n$ when the clutch members are separated, is thus utilized, permitting the immediate reëngagement of said members after a momentary separation thereof.

The recessed construction of the hub $h$ and its extension into the cylinder $g$ and the direct attachment of the transmission shaft or connection $o$ to the outer end of the hub, make the clutch more compact, besides simplifying and improving its construction.

I claim:

1. In a friction clutch the combination of a member having a central spindle, a piston having a hub rotatably mounted and confined endwise on said spindle, a second member provided with a recessed hub mounted and movable endwise on the piston hub and with a cylinder fitting said piston and having a restricted opening in communication with the atmosphere, a spring inclosed in said recessed hub between one end thereof and a bearing on said spindle and tending to hold the clutch members in engagement with each other, and means for separating said clutch members.

2. In a friction clutch the combination of a member having an internally coned friction rim and a central spindle on the same side, a piston having a hub rotatably mounted and confined endwise on said spindle, a second member having an externally coned rim fitting into the internally coned rim of the other member and provided with a recessed hub mounted and movable endwise on the piston hub and with a cylinder fitting said piston and having a restricted opening communicating with the atmosphere, a spring inclosed in said recessed hub between one end thereof and a ball bearing on said spindle and tending to hold the clutch members in engagement with each other, a shifting collar loosely mounted on the hub of the movable clutch member, and a ball bearing between said collar and a shoulder on said hub.

3. In a friction clutch the combination of a driving member having an internally coned rim and a central spindle on the same side, a piston having a hub rotatably mounted and confined endwise on said spindle, a conically flanged sheet metal driven member fitting into the internally coned rim of the other clutch member, a recessed hub mounted and movable endwise on the piston hub and formed with a cylinder which is fastened to the web of the driven member and which fits upon said piston and has a restricted opening for the passage of air, a spring inclosed in said recessed hub between one end thereof and a bearing on said spindle, a transmission member attached to the recessed hub, and means for separating the clutch members.

In witness whereof I hereto affix my signature in presence of two witnesses.

HENRY A. VERGES.

Witnesses:
 CHAS. L. GOSS,
 ALICE E. GOSS.